United States Patent
Kumar et al.

(10) Patent No.: US 9,026,598 B2
(45) Date of Patent: May 5, 2015

(54) AUTOMATICALLY GENERATING REQUEST-SPECIFIC BACKUP CONTACT INFORMATION IN AN OUT OF OFFICE MESSAGE

(75) Inventors: Shruti Kumar, Littleton, MA (US); Aruna Kalagnanam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 11/953,810

(22) Filed: Dec. 10, 2007

(65) Prior Publication Data

US 2009/0150500 A1 Jun. 11, 2009

(51) Int. Cl.
G06F 15/16 (2006.01)
G06Q 10/10 (2012.01)
H04L 12/58 (2006.01)

(52) U.S. Cl.
CPC .............. *G06Q 10/107* (2013.01); *H04L 12/58* (2013.01)

(58) Field of Classification Search
CPC ... H04L 12/58; H04L 12/5805; G06Q 10/107
USPC .......................................... 709/217, 219, 238
See application file for complete search history.

(56) References Cited

U.S. PATENT DOCUMENTS

| | | | |
|---|---|---|---|
| 6,278,996 B1 | 8/2001 | Richardson et al. | |
| 6,658,095 B1 | 12/2003 | Yoakum et al. | |
| 6,718,368 B1 | 4/2004 | Ayyadurai | |
| 6,816,885 B1 | 11/2004 | Raghunandan | |
| 6,988,128 B1 * | 1/2006 | Alexander et al. | ............ 709/206 |
| 2002/0152272 A1 | 10/2002 | Yairi | |
| 2004/0001090 A1 | 1/2004 | Brown et al. | |
| 2006/0248147 A1 * | 11/2006 | Hill et al. | ...................... 709/206 |
| 2008/0294734 A1 * | 11/2008 | Pickover | ...................... 709/206 |
| 2009/0150365 A1 * | 6/2009 | Chow et al. | ...................... 707/4 |

OTHER PUBLICATIONS

Bergman et al., A Personal Email Assistant, Hewlett-Packard Laboratories, Aug. 2002, pp. 1-22 and cover sheet.
Vortman, E-Mail Intelligent Routing and Responding, IBM Haifa Reserch Lab, Jun. 30, 1997, pp. 1-8.

* cited by examiner

*Primary Examiner* — Noel Beharry
*Assistant Examiner* — Scott M Sciacca
(74) *Attorney, Agent, or Firm* — BainwoodHuang

(57) ABSTRACT

A system for automatically generating request-specific backup contact information in an out of office message that automatically generates an out of office message with specific backup contact information based on an automatically determined correspondence between the contents of a received e-mail message and one or more responsibilities of the user an e-mail message is addressed to. A user interface object allows a user to specify one or more keywords for each different one of their roles/responsibilities, and to also specify corresponding backup contact information for each role/responsibility. Incoming e-mail messages are analyzed to detect the user's keywords used to identify one or more corresponding roles/responsibilities. Based on this detection of keywords in the received message and the correspondence of the detected keywords with role/responsibility back up contact information in the persistent storage, only relevant backup contact information is retrieved and included in the out of office reply.

7 Claims, 3 Drawing Sheets

SET OUT OF OFFICE MESSAGE — 100

| DATE — 102 | OUT OF OFFICE MESSAGE — 104 | | | BACKUP CONTACTS — 106 |
|---|---|---|---|---|
| | ROLE AND/OR RESPONSIBILITY | KEYWORDS | BACKUP CONTACT | EMAIL ADDRESS AND PHONE # OF BACKUP CONTACT |
| | Project Architect | architecture, high level design, low level design, design specification | John Smith | John_smith@company.com 555-222-3333 |
| | Open Source Issues Contact | open source, project McGriff, committer, contributor | Bob Jones | Bob_jones@company.com 555-222-3334 |
| | Messaging and Instant Messaging Component | messaging, IM, IM component, instant messenger | Ron Thompson | Ron_thompson@company.com 555-222-3335 |
| | Ski Club President | ski club, skiing, ski trip, Sunday River | Nikki Bailey | Nikki_bailey@company.com 555-222-4444 |

AUTOMATICALLY GENERATING REQUEST-SPECIFIC BACKUP CONTACT INFORMATION IN AN OUT OF OFFICE MESSAGE

FIELD OF THE INVENTION

The disclosed system relates generally to electronic mail systems, and more specifically to a method and system for automatically generating request-specific backup contact information in an out of office message.

BACKGROUND OF THE INVENTION

As it is generally known, electronic mail ("e-mail") is a store and forward messaging technology for composing, sending, storing, and receiving messages over electronic communication systems. E-mail is asynchronous and does not require the receiver of a message to be online at the time the message is sent or received. Messages are exchanged between hosts using the Simple Mail Transfer Protocol (SMTP) with software programs called mail transport agents. Users can download their messages from servers with standard protocols such as the POP or IMAP protocols, or using proprietary protocols.

Existing e-mail systems enable a user to define an out of office message that is automatically sent as a reply to messages received during time periods when the user has indicated that he or she is not able to respond. However, as explained in detail below, existing systems do not effectively provide out of office messages for users having multiple job responsibilities.

When a user has multiple responsibilities, each different responsibility will likely have a different set of one or more alternative contacts to be used when the user is unavailable. Existing systems necessitate that the user's out of office message include a potentially lengthy list of all such alternative contacts, with indications of which of the user's responsibilities is associated with which specific contact.

For example, assuming User A has the following responsibilities:
  a) technical lead for a new product design and architecture,
  b) point of contact for open source questions and issues,
  c) support for an existing instant messaging component, and
  d) president of a ski club.
User A's out of office message would need to contain backup contacts for all of the above responsibilities. Accordingly, when another user, e.g. User X, sends an e-mail message to User A while User A is out of the office, User X would be automatically sent an out of office e-mail message with the whole list of contact information. Such a message might, for example, be as follows:
"I will be out of office from Jan. 2, 2007 till Jan. 20, 2007. Please contact
  1) User B for new product architecture and design questions & issues,
  2) User C for open source questions & issues,
  3) User D for instant messaging component questions & issues, and
  4) User E for ski club activities."
When User X receives the above out of office message, he or she has to go through the complete backup contact list to determine which user to contact for his or her particular need. It would accordingly be desirable to have a new system that allows User X to receive a customized out of office message containing only the backup contact information that is appropriate for their request.

One existing system (see http://www.novell.com/coolsolutions/tip/9559.html) outlines a method for using rules/filters to set up an out of office message. In another existing system (see U.S. patent application publication 2005/0021636), incoming e-mail is identified as either internal or external, and different out of office messages may be sent to internal and external users based that identification. These previous solutions allow a user to customize their out of office message based on filters and rules. Filters and rules in these previous systems send different "out of office" messages to selected other users or to internal and external users. However, these systems do not alleviate the problem of users receiving a lengthy out of office message in which they must sift through a lengthy list of backup contacts in order to find the appropriate person to help them with the subject of their original message. Existing systems do not provide any way to generate an out of office message that includes specific backup contact information that matches the type of inquiry that was received.

SUMMARY OF THE INVENTION

To address the above described and other shortcomings of previous techniques, a method and system are disclosed for automatically generating request-specific backup contact information in an out of office electronic mail message. The disclosed system automatically generates an out of office message with specific backup contact information based on an automatically determined correspondence between the contents of a received e-mail message and one or more specific, pre-defined responsibilities of the user that the received e-mail message is addressed to.

The disclosed system generates a graphical user interface including a user interface object that allows a user to specify one or more keywords for each different one of their roles/responsibilities, and to also specify corresponding backup contact information for each role/responsibility. The input keywords and contact information are persistently stored, e.g. in the form of a table.

When the out of office feature of the disclosed system is enabled by the user, incoming e-mail messages are analyzed to detect the user's keywords. Text analysis and information retrieval techniques may be used to analyze the subject and/or contents of a received message to locate keywords. When keywords are detected, they are used to identify one or more corresponding roles/responsibilities in the persistent storage. Based on this detection of keywords in the received message and the correspondence of the detected keywords with role/responsibility back up contact information in the persistent storage, only relevant backup contact information is retrieved and included in the automatically generated out of office reply generated for the received e-mail message.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 3 is a simplified screen shot that inputs keyword and back-up contact information for multiple responsibilities of a user.

DETAILED DESCRIPTION OF EXEMPLARY EMBODIMENTS

Figure 1:
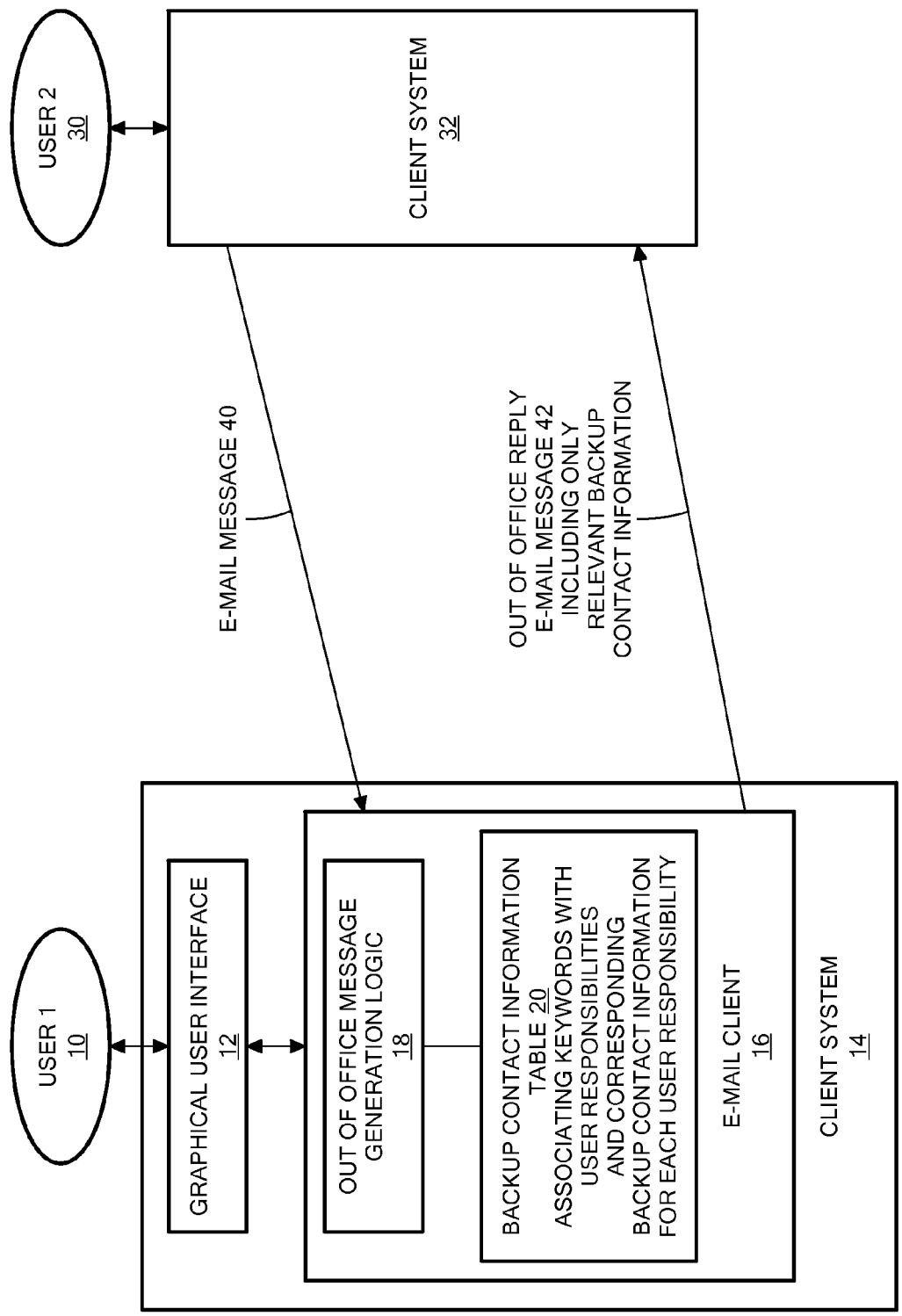
FIG. 1 is a block diagram showing hardware and software components in an illustrative embodiment.

FIG. 1 is a block diagram showing hardware and software components in an illustrative embodiment. As shown in FIG. 1, a User 1 10 is provided a Graphical User Interface 12 in a Client System 14 by an E-Mail Client 16. The E-Mail Client 16 includes Out of Office Message Generation Logic 18 and a Backup Contact Information Table 20. The Backup Contact Information Table 20 associates keywords with user responsibilities and corresponding backup contact information for each user responsibility of User 1 10.

During operation of the embodiment shown in FIG. 1, a user interface display object is generated by the E-Mail Client 16 within the Graphical User Interface 12 that allows User 1 10 to define a number of responsibilities, together with keywords and backup contact information for each responsibility. User responsibilities may include any specific kind of responsibility or role, such as project leader, system architect, team member, social coordinator, or any other specific role a user might wish to define. The keywords associated with a given responsibility may be any specific words, terms, or phrases that relate to the responsibility. Contact information for a responsibility may include the name(s) of one or more persons that should be contacted in User 1 10's absence with regard to questions or issues relating to the responsibility, as well each backup contact person's relevant contact information, such as location, e-mail address, office telephone number, cell phone number, instant messaging screen name, and/or any other appropriate type of contact information.

Each user responsibility is stored in the Backup Contact Information Table 20 together with the keywords and backup contact information associated with it. The Backup Contact Information Table 20 is organized such that the backup contact information for a given user responsibility can be retrieved (e.g. by the Out of Office Message Generation Logic 18) based on one or more keywords that are associated with that user responsibility.

During operation of the illustrative embodiment shown in FIG. 1, User 2 30 originates a e-mail Message 40 that is addressed to the e-mail address of User 1 10. The Message 40 is transmitted from Client System 32 over a communication network (not shown), and is eventually received by Client System 14. Upon receipt of the Message 40, the E-mail Client 16 automatically determines that the out of office feature has been enabled by User 1 10, and triggers the Out of Office Message Generation Logic 18. The Out of Office Message Generation Logic 18 scans the subject and/or body of the received Message 40 to determine if any portion of the subject and/or body of the received Message 40 matches any of the keywords stored in the Backup Contact Information Table 20. If a match is found, then the user responsibility associated with the matching keyword is identified, and the contact information for that user responsibility retrieved from the Backup Contact Information Table 20. The Out of Office Message Generation Logic 18 stores the retrieved contact information in an out of office message generated by the Out of Office Message Generation Logic 18. The generated out of office message is then transmitted by the E-mail client to User 2 30, as shown by Out of Office Message Reply E-Mail Message 42, which includes only backup contact information that is relevant to the contents of Message 40.

The Client Systems 14 and 32 of FIG. 1 may be any specific type of a computer system or intelligent electronic device, such as a desktop, laptop, or palmtop computer system, or a personal digital assistant, cell phone, or other electronic device. The Client Systems 14 and 32 each include or control display devices capable of displaying a graphical user interface (e.g. including Graphical User Interface 12) to a local user (e.g. User 1 12), such as a liquid crystal display (LCD), cathode ray tube (CRT), interferometric modulator display (IMOD), light emitting diode (LED), or the like.

Those skilled in the art will further recognize that E-mail Client 16 may be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware. Those skilled in the art will further recognize that the Client Systems 14 and 32 may each include one or more processors, and program storage, such as memory, for storing program code executable on such processors, as well as input/output devices and/or interfaces. In the example of FIG. 1, the Client Systems 14 and 32 are interconnected through a data communication network (e.g. the Internet, a Local Area Network, etc.) using one or more of such input/output devices or interfaces, and through which may further be provided communication to a number of other client systems and/or remote server systems.

While for purposes of concise illustration only two client systems and respective users are shown in FIG. 1, the disclosed system is not limited to any specific number of users and/or client systems. Moreover, while certain functions are described as being performed in E-mail Client 16, the disclosed system is not limited to any specific configuration or implementation in that regard. Accordingly, operations and/or data structures described as being performed by and/or contained in E-mail Client 16 may alternatively be performed by and/or contained in an e-mail application server component executing on one or more server systems communicably connected to the Client System 14 and Client System 32.

In addition, while the illustrative embodiment of FIG. 1 is implemented in a client-server architecture, the disclosed system is not limited to such an embodiment, and may alternatively be embodied using any other specific type of system architecture that may be appropriate and or advantageous for a given embodiment.

Figure 2:
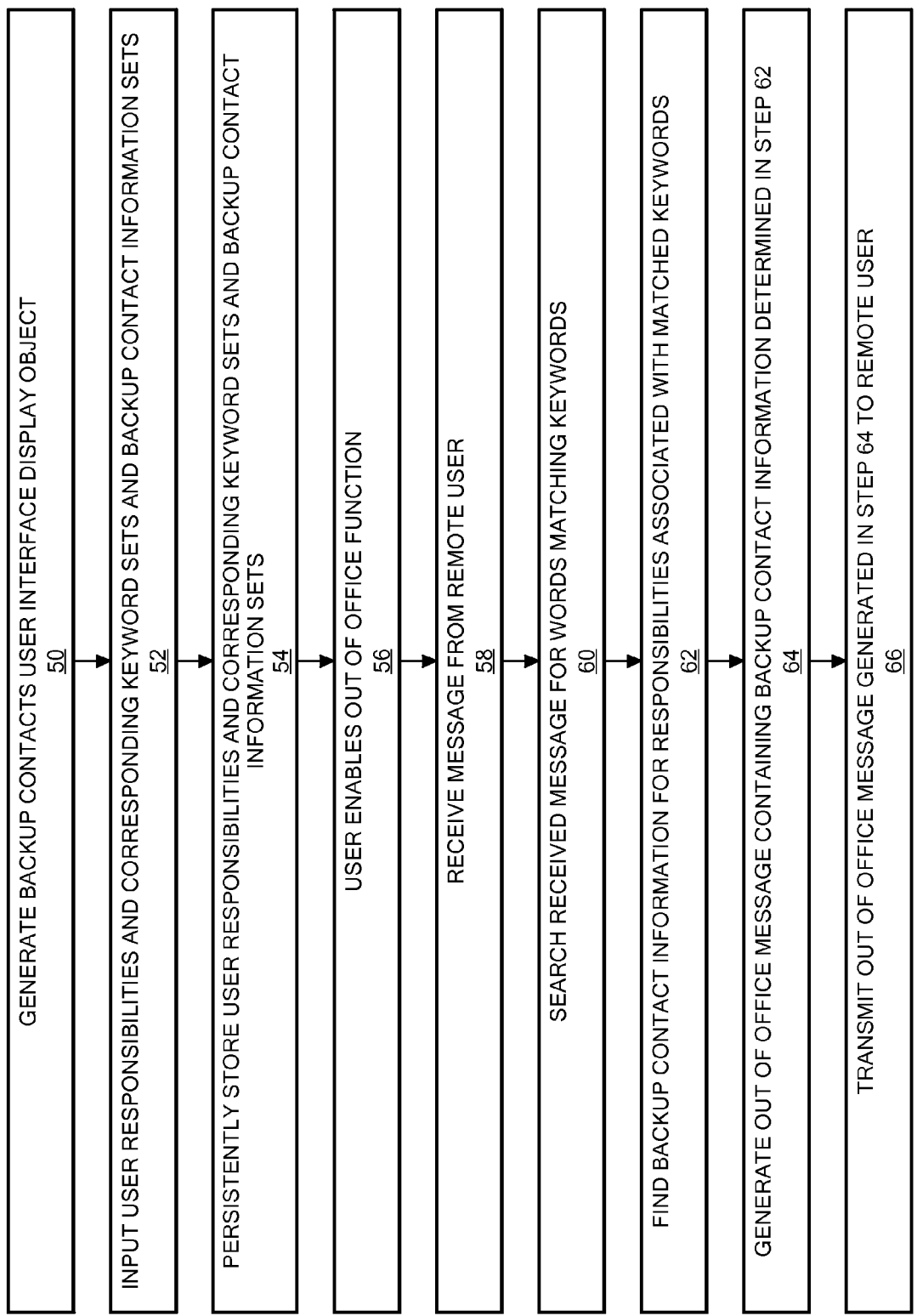
FIG. 2 is a flow chart showing steps performed during operation of an illustrative embodiment.

FIG. 2 is a flow chart showing steps performed during operation of an illustrative embodiment. As shown in FIG. 2, at step 50 the disclosed system generates a backup contacts user interface display object (see FIG. 3). The disclosed system then inputs user responsibilities and corresponding keyword sets and backup contact information sets at step 52. A keyword set for a user responsibility consists of those keywords entered by the user to be associated with the user responsibility. Similarly, the set of backup contact information for a user responsibility consists of the names and contact information (e.g. phone number, e-mail address, screen name, etc.) of each backup contact for that user responsibility.

At step 54, the disclosed system persistently stores the input user responsibilities with their corresponding keyword sets and backup contact information sets (e.g. in Backup Contact Information Table 20 of FIG. 1). Next in the example of FIG. 2, the user enables the out of office function at step 56, for example by indicating a period of time (e.g. from a start date to an end date) during which out of office messages are to be generated and transmitted in response to received e-mail messages addressed to the user.

Subsequently, during the time period defined at step 56, an e-mail message addressed to the user is received from a remote user at step 58. The disclosed system responds to receipt of the e-mail message at step 58 by searching the received message (e.g. subject line, body, etc.) at step 60 for words, terms, phrases, etc. that match any of the keywords in the keyword sets input at step 52. For each word matching a keyword, the disclosed system operates at step 62 the disclosed system finds the backup contact information for the user responsibility associated with the keyword. The backup contact information found at step 62 is then inserted or otherwise added to an out of office e-mail message generated at step 64. The out of office e-mail message generated at step 64 is then transmitted at step 66 to the remote user that sent the message received at step 58.

FIG. 3 is a simplified screen shot that inputs keyword and back-up contact information for multiple responsibilities of a user. FIG. 3 shows a set out of office user interface display object 100, as may be provided as part of the Graphical User Interface 12 shown in FIG. 1. The user interface display object 100 includes a first tab 102 through which a user can access fields, menus etc. enabling the user to define a time period during which the out of office message feature should be enabled, i.e. responses should be automatically generated to received e-mail messages for the user. A second tab 104 allows the user to access fields, menus etc. that enable the user to define an out of office message that will be augmented with user provided backup contact information defined through third tab 106.

Within the third tab 106, a table of user editable fields is provided having rows corresponding to individual user responsibilities. A column 108 defines the user responsibility for each row. A column 1 10 defines keywords for each user responsibility, and the columns 112 and 114 define the backup contact information for each user responsibility. Specifically, column 112 defines the backup contact name for each user responsibility, and column 114 defines e-mail address and phone number information backup contact information.

During an example of operation of the illustrative embodiment shown in FIG. 3, if a received e-mail message is received during the time period defined through tab 102, the out of office message defined through tab 104 will be generated including information from columns 112 and 114 corresponding to keywords matched in the received e-mail message. For example, if a message were received by a local user (e.g. Carol Van Dyke) from a remote user, and having a subject "Question related to the use of Open source", the disclosed system would generate and transmit an out of office message to the remote user such as the following:

"Carol Van Dyke will be out of the office from Jan. 2, 2007 till Jan. 20, 2007. Please contact Bob Jones (Bob_jones@company.com, 555-222-3335) for Open Source questions and issues."

In another example, if a remote user sends an e-mail message to the local user asking for some input regarding an instant messaging component (e.g. "Is the IM component release ready?" contained in the message body), the disclosed system would generate and transmit an out of office message to the remote user such as the following:

"I will be out of the office from Jan. 2, 2007 till Jan. 20, 2007. Please contact Ron Thompson (Ron_thompson@company.com, 555-222-3335) for Messaging and IM Component questions and/or issues."

Whereas the above examples describe scenarios in which only one user responsibility is matched by a received message, the disclosed system is not limited in that regard.

Accordingly, if a message is received that includes contents that matches keywords of multiple ones of the user's responsibilities, then backup contact information for all of the matched responsibilities may be included in the automatically generated out of office message sent as a response. Moreover, in the case where no keywords of any of the user's pre-defined responsibilities are found in the received message, then an out of office response message may be generated that includes all of the backup contact information for all of the user's responsibilities.

While the above description regarding illustrative embodiments of the disclosed system includes examples of specific user interface operations and/or display objects, such as may be provided using graphical buttons, menus, dialog boxes, and the like, the present invention is not limited to these specific examples. Accordingly, those skilled in the art will recognize that alternative embodiments may use any specific type or kind of user interface display object that may be appropriate to provide the specific operations described.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method for providing request-specific out of office messages in an electronic mail system, comprising:

displaying a backup contacts user interface display object, wherein said backup contacts user interface display object includes a plurality of rows, each row including a user editable field enabling a user to input a job title, a user editable field enabling said user to input a set of keywords associated with said job title, a user editable field enabling said user to input a backup contact name to be associated with said job title, and a user editable field enabling said user to input a backup contact electronic mail address and backup contact phone number to be associated with said job title;

for each row in said backup contacts user interface display object, persistently storing said keywords, backup contact name, backup contact electronic mail address and backup contact phone number in a computer readable memory in association with said job title;

searching an electronic mail message addressed to said user for words matching said keywords stored in said memory;

determining, in response to said searching, that said received electronic mail message contains a plurality of words matching corresponding ones of said keywords;

determining, for each one of said plurality of words in said received electronic mail message matching corresponding ones of said keywords, which job titles stored in said memory said matching keyword is associated with;

determining backup contact name, backup contact electronic mail address and backup contact phone number for each of said job titles said matching keywords are associated with;

generating an out of office electronic mail message specifically for said received electronic mail message, wherein said generating includes inserting said backup contact name, backup contact electronic mail address and backup contact phone number associated with each of said job titles said matching keywords are associated with into a body of said out of office electronic mail message, and wherein said generating said out of office electronic mail message includes inserting said backup contact name, backup contact electronic mail address and backup contact phone number associated with each of the plurality of said job titles stored in said memory in the event that none of said plurality of words in said received electronic mail message match any of said keywords; and transmitting said generated out of office electronic mail message to a user that sent said received electronic mail message.

2. The method of claim 1, wherein said searching said electronic mail message comprises searching a subject field of said electronic mail message.

3. The method of claim 2, wherein said searching said electronic mail message further comprises searching a body of said electronic mail message.

4. A computer system including a computer readable memory having program code stored thereon, said program code operable when executed to cause said computer system to provide request-specific out of office messages in an electronic mail system by:

displaying a backup contacts user interface display object, wherein said backup contacts user interface display object includes a plurality of rows, each row including a user editable field enabling a user to input a job title, a user editable field enabling said user to input a set of keywords associated with said job title, a user editable field enabling said user to input a backup contact name to be associated with said job title, and a user editable field enabling said user to input a backup contact electronic mail address and backup contact phone number to be associated with said job title;

for each row in said backup contacts user interface display object, persistently storing said keywords, backup contact name, backup contact electronic mail address and backup contact phone number in a computer readable memory in association with said job title;

searching an electronic mail message addressed to said user for words matching said keywords stored in memory;

determining, in response to said searching, that said electronic mail message contains a plurality of words matching corresponding ones of said keywords;

determining, for each one of said plurality of words in said received electronic mail message matching corresponding ones of said keywords, which job titles stored in said memory said matching keyword is associated with;

determining backup contact name, backup contact electronic mail address and backup contact phone number for each of said job titles said matching keywords are associated with;

generating an out of office electronic mail message specifically for said received electronic mail message, wherein said generating includes inserting said backup contact name, backup contact electronic mail address and backup contact phone number associated with each of said job titles said matching keywords are associated with into a body of said out of office electronic mail message, and wherein said generating said out of office electronic mail message includes inserting said backup contact name, backup contact electronic mail address and backup contact phone number associated with each of the plurality of said job titles stored in said memory in the event that none of said plurality of words in said received electronic mail message match any of said keywords; and transmitting said generated out of office electronic mail message to a user that sent said received electronic mail message.

5. The system of claim 4, wherein said searching said electronic mail message comprises searching a subject field of said received electronic mail message.

6. The system of claim 5, wherein said searching said electronic mail message further comprises searching a body of said received electronic mail message.

7. A computer program product including a non-signal computer readable storage medium, said non-signal computer readable storage medium having program code stored thereon for providing request-specific out of office messages in an electronic mail system, said program code comprising:

program code for displaying a backup contacts user interface display object, wherein said backup contacts user interface display object includes a plurality of rows, each row including a user editable field enabling a user to input a job title, a user editable field enabling said user to input a set of keywords associated with said job title, a user editable field enabling said user to input a backup contact name to be associated with said job title, and a user editable field enabling said user to input a backup contact electronic mail address and backup contact phone number to be associated with said job title;

program code for, for each row in said backup contacts user interface display object, persistently storing said keywords, backup contact name, backup contact electronic mail address and backup contact phone number in a computer readable memory in association with said job title;

program code for searching an electronic mail message addressed to said user for words matching said keywords stored in said memory;

program code for determining, in response to said searching, that said received electronic mail message contains a plurality of words matching corresponding ones of said keywords;

program code for determining, for each of said plurality of words in said received electronic mail message matching corresponding ones of said keywords, which job titles stored in said memory said matching keywords are associated with;

program code for determining backup contact name, backup contact electronic mail address and backup contact phone number for each of said job titles said matching keywords are associated with;

program code for generating an out of office electronic mail message specifically for said received electronic mail message, wherein said generating includes inserting said backup contact name, backup contact electronic mail address and backup contact phone number associated with each said of said job titles said matching keywords are associated with into a body of said out of office electronic mail message, and wherein said generating said out of office electronic mail message includes inserting said backup contact name, backup contact electronic mail address and backup contact phone number associated with each of the plurality of said job titles stored in said memory in the event that none of said plurality of words in said received electronic mail message match any of said keywords; and program code for transmitting said generated out of office electronic mail message to a user that sent said received electronic mail message.

* * * * *